(12) United States Patent
Duerksen

(10) Patent No.: US 8,948,690 B2
(45) Date of Patent: Feb. 3, 2015

(54) DOPPLER-NULLING TRAVELING-WAVE ANTENNA RELAYS FOR HIGH-SPEED VEHICULAR COMMUNICATIONS

(75) Inventor: Gary L. Duerksen, Ward, CO (US)

(73) Assignee: Empire Technology Development LLC, Wilmington, DE (US)

( * ) Notice: Subject to any disclaimer, the term of this patent is extended or adjusted under 35 U.S.C. 154(b) by 408 days.

(21) Appl. No.: 13/395,880

(22) PCT Filed: Sep. 21, 2011

(86) PCT No.: PCT/US2011/005275
§ 371 (c)(1),
(2), (4) Date: Mar. 13, 2012

(87) PCT Pub. No.: WO2013/043168
PCT Pub. Date: Mar. 28, 2013

(65) Prior Publication Data
US 2013/0069834 A1 Mar. 21, 2013

(51) Int. Cl.
*H04B 7/15* (2006.01)
*H04B 7/14* (2006.01)
*H04B 1/00* (2006.01)
*H04B 15/00* (2006.01)
*H01Q 1/32* (2006.01)
*H01Q 13/20* (2006.01)
*H04W 84/00* (2009.01)

(52) U.S. Cl.
CPC ............... *H01Q 1/32* (2013.01); *H01Q 13/203* (2013.01); *H04W 84/005* (2013.01)
USPC ............................ 455/25; 455/11.1; 455/63.4

(58) Field of Classification Search
CPC .. H04B 7/14; H04B 7/15507; H04B 7/15542; H04B 7/1555; H04B 7/1855; H04B 10/29; H04B 2203/5479
USPC ......... 455/7, 10, 11.1, 15, 19, 25, 63.4, 562.1
See application file for complete search history.

(56) References Cited

U.S. PATENT DOCUMENTS

| | | | |
|---|---|---|---|
| 3,550,130 A * | 12/1970 | Shaw | 342/418 |
| 6,909,892 B2 | 6/2005 | Tuji et al. | |
| 6,909,893 B2 | 6/2005 | Aoki et al. | |
| 7,299,013 B2 * | 11/2007 | Rotta et al. | 455/67.16 |
| 7,653,347 B2 | 1/2010 | Klotsche et al. | |
| 8,457,546 B2 * | 6/2013 | Mahajan et al. | 455/7 |

(Continued)

OTHER PUBLICATIONS

Sanders, "The Many Flavors of ODDMA," wi-fiplanet.com, Oct. 19, 2005 www.wi-planet.com/tutorials/article.php/10724_3557416_2/The-Many-Flavors-of-OFDMA.htm.

(Continued)

*Primary Examiner* — Andrew Wendell
(74) *Attorney, Agent, or Firm* — Turk IP Law, LLC

(57) ABSTRACT

An antenna relay system for facilitating wireless communication between mobile terminals on a high-speed rail vehicle and stationary base stations with substantially reduced Doppler shift effects comprises matched traveling wave directional antennas mounted to a high-speed rail vehicle and positioned collinearly alongside the railway. Both antennas continually transmit and receive at a fixed angle relative to the motion of the train so as to circumvent the Doppler shift. The signal transmitted or received by the stationary antenna is conducted to a nearest node for communication with an access network.

33 Claims, 12 Drawing Sheets

(56) References Cited

U.S. PATENT DOCUMENTS

| | | | |
|---|---|---|---|
| 2005/0020203 A1* | 1/2005 | Losh et al. | 455/11.1 |
| 2005/0031344 A1* | 2/2005 | Sato et al. | 398/42 |
| 2007/0262855 A1* | 11/2007 | Zuta et al. | 340/439 |
| 2008/0261520 A1* | 10/2008 | Bassiri et al. | 455/7 |
| 2009/0219900 A1 | 9/2009 | Kokkinen et al. | |
| 2010/0317293 A1 | 12/2010 | Yokoyama | |
| 2011/0010025 A1* | 1/2011 | Eu et al. | 701/2 |
| 2011/0028099 A1* | 2/2011 | Cohen et al. | 455/63.4 |
| 2012/0326938 A1* | 12/2012 | Grossman et al. | 343/833 |
| 2013/0114496 A1* | 5/2013 | Mazzarese et al. | 370/312 |
| 2014/0011442 A1* | 1/2014 | Dussmann | 455/10 |

OTHER PUBLICATIONS

High-speed rail in China on Wikipedia Static URL accessed Oct. 28, 2011; High_speed_rail_in_China http://en.wikipedia.org/wiki/High_speed_rail_in_China[Aug. 30, 2011 3:37:17 PM], 20 pages.

Fazwk et al., "Multi-carrier and spread spectrum systems:" From OFDM and MC-CDMA to LTE and WiMAX, Second Edition, 2008 A John Wiley and Sons, Ltd, Publication, 376 pages.

Frezza, "Introduction to Traveling-Wave antennas," European School on Antennas; Mar. 19, 2006, 10 pages.

The Doppler Effect. Static URL accessed Oct. 28, 2011; http://www.mathpages.com/home/kmath587/kmath587.htm [Aug. 30, 2011 3:36:33 PM], 4 pages.

Fokum et al., A Survey on Methods for Broadband Internet Access on Trains Authors: Communications Surveys & Tutorials, IEEE Start p. 171 End p. 185 ISSN: 1553-877X ISBN: vol. 12 Issue: 2, 2010.

Wang et al., Theory and analysis of leaky coaxial cables with periodic slots Authors: Antennas and Propagation, IEEE Transactions on Start p. 1723 End p. 1732 ISSN: 0018-926X ISBN: vol. 49 Issue: 12 Dec. 2001.

Gugliemi et al., Broadside radiation from periodic leaky-wave antennas Authors: Antennas and Propagation, IEEE Transactions on Start p. 31 End p. 37 ISSN: 0018-926X ISBN: Volume: 41 Issue: 1, Jan. 1993.

International Search Report and Written Opinion PCT/US2011/052575 International filing date Sep. 21, 2011, mailed Feb. 17, 2012, 8 pages.

International Preliminary Report on Patentability for PCT/US2011/052575 filed Sep. 21, 2011, mailed on Apr. 3, 2014, issued Mar. 25.

Oliner, A., A., and Jackson, D., R., "Leaky-Wave Antennas," in antenna engineering handbook, Ed. Volakis, J. L., McGraw Hill, chapter 11, 4th Edition, pp. 1-55 (2007).

* cited by examiner

DOPPLER-NULLING TRAVELING-WAVE ANTENNA RELAYS FOR HIGH-SPEED VEHICULAR COMMUNICATIONS

BACKGROUND

Unless otherwise indicated herein, the materials described in this section are not prior art to the claims in this application and are not admitted to be prior art by inclusion in this section.

Advanced wireless communication systems achieve greater bandwidth efficiency by partitioning the communication channels into increasingly narrow sub-channels. The receivers, in turn, need to use selective filters in order to separate the different carriers, rendering these systems susceptible to interference created by a frequency mismatch between the transmitter and receiver. A Doppler shift resulting from the motion a transmitter relative to the receiver generates a frequency offset that may become problematic for wireless communication with high-speed vehicles.

Strategies for mitigating Doppler shifts such as adjusting transmission frequency or using rake receivers in the frequency-domain fail to correct the underlying problem, the change in carrier frequency introduced by the relative motion of the transmitting and receiving antennas. The Doppler shift impacts wireless communication most severely in high-speed transportation systems such as High Speed Rail (HSR). HSR communication systems enabling passengers to use their wireless communication devices such as cellular phones typically have a fixed infrastructure that supports wireless communication.

SUMMARY

The present disclosure generally describes techniques for enhanced wireless communication between mobile terminals on high-speed vehicles and stationary base stations.

According to some examples, a method for enhancing wireless communications in high-speed vehicles through Doppler-nulling traveling-wave antenna relays may include aggregating wireless traffic from a plurality of wireless communication devices at an access terminal on a moving vehicle; and forwarding the wireless traffic to a wireless communication network through a pair of matched traveling-wave directional antennas. A first of the antennas may be positioned on the moving vehicle and a second of the antennas may be positioned along a path of the moving vehicle. The second antenna may be conductively coupled to one or more access nodes of the wireless communication network.

According to other examples, a wireless communication system enabling communication between high-speed vehicles and a terrestrial network through Doppler-nulling traveling-wave antenna relays may include an access terminal adapted to aggregate wireless traffic from a plurality of wireless communication devices on a moving vehicle and forward the aggregated wireless traffic to the terrestrial network through a pair of matched traveling-wave directional antennas, a first traveling-wave directional antenna affixed to the moving vehicle, and a second traveling-wave directional antenna positioned along a path of the moving vehicle. The second antenna may be conductively coupled to one or more access nodes of the wireless communication network.

According to further examples, a traveling-wave, directional antenna system for enabling wireless communication between high-speed vehicles and a terrestrial network may include a first traveling-wave directional antenna affixed to a moving vehicle adapted to receive aggregated wireless traffic from a plurality of wireless communication devices on the moving vehicle and forward the wireless traffic to the terrestrial network through a matching second traveling-wave antenna and the second traveling-wave directional antenna positioned along a path of the moving vehicle and conductively coupled to one or more access nodes of the wireless communication network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
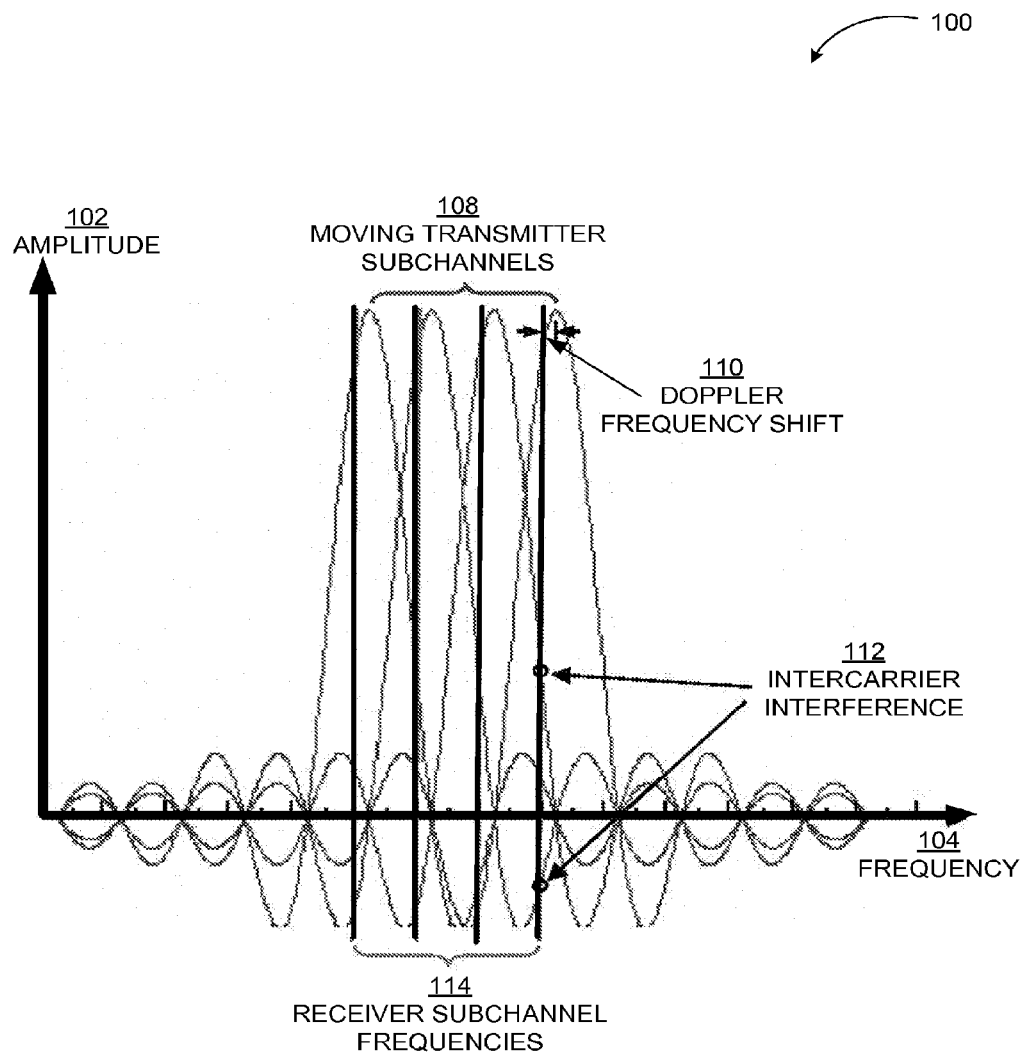
FIG. 1 illustrates a graph of the Doppler shift from a moving transmitter seen by a stationary receiver.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to enhancing for wireless communication between mobile terminals on high-speed vehicles and stationary base stations.

Briefly stated, an antenna relay system that comprises matched traveling wave directional antennas mounted to a high-speed rail vehicle and positioned collinearly alongside the railway provides wireless communication between mobile terminals on the high-speed rail vehicle and stationary base stations substantially reducing Doppler shift effects. Both antennas may continually transmit and receive at a fixed angle relative to the motion of the train so as to preclude Doppler shift of the signals. The signal transmitted or received by the stationary antenna may be conducted to a nearest node for communication with an access network.

FIG. 1 illustrates a graph of Doppler shift from a moving transmitter seen by a stationary receiver. As discussed above, narrow sub-channels are used for enhanced bandwidth efficiency in advanced wireless communication systems. This results in a need for receivers with selective filters in order to separate the different carriers, rendering these systems susceptible to interference created by a frequency mismatch between the transmitter and receiver. As illustrated in graph 100, the Doppler shift 110 resulting from the motion a transmitter relative to the receiver generates a frequency offset.

In 3GPP LTE systems, for example, the nominal Orthogonal Frequency Division Multiplexing (OFDM) sub-channel spacing is 15 kHz, while for scalable OFDM in mobile WiMax the sub-channel spacing can be as small as 10 kHz. High-speed conventional rail lines can operate at top speeds of 350 km/h, producing a Doppler shift of up to 780 Hz for a 2.4 GHz carrier frequency. If uncorrected, frequency shifts of this magnitude can cause inter-carrier interference that may significantly degrade the system performance. The situation may further be exacerbated by multipath effects, where different signal paths not only introduce different time delays (producing inter-symbol interference) but the dependence of the Doppler shift on the motion of the transmitter relative to the reflecting path may also produce different frequency shifts for the different paths, further contributing to inter-carrier interference.

Graph 100 illustrates, across frequency axis 104 and amplitude axis 102, inter-carrier interference 112 caused by the Doppler shift 110 between moving transmitter sub-channels 108 and receiver sub-channels 114. One of the strategies for mitigating Doppler shifts includes a base station instructing the mobile transmitter to adjust its transmission frequency, although the tuning range for a mobile terminal may be limited and frequent updates necessitated by the changing transmission angle may incur considerable signaling overhead. Another approach includes use of rake receivers in the frequency domain to resolve each multipath signal from a single mobile terminal using a different branch of the receiver. However, the potential for inter-carrier interference between mobile terminals may remain even with this strategy. Further, none of these strategies corrects the underlying problem, the change in carrier frequency introduced by the relative motion of the transmitting and receiving antennas.

HSR, which is a transportation mode highly susceptible to Doppler shift effects on wireless communication, is also amenable to the disclosed approach because of its fixed infrastructure. Embodiments virtually eliminate the Doppler shift in wireless communications with mobile terminals on high-speed rail by relaying the signals through a collinear traveling-wave antenna system mounted on the moving train and alongside the railway. The matched traveling wave directional antennas of a system according to embodiments may continually transmit and receive at a fixed angle relative to the motion of the train so as to circumvent the Doppler shift. The signal transmitted or received by the stationary antenna may be conducted to a nearest node for communication with an access network. The approach exploits the directional dependence of the Doppler spectrum of a moving transmitter by concentrating the radio signal in a distributed highly-directional transmission at the angle of the Doppler null, eliminating the Doppler frequency shift. According to some embodiments, the traveling-wave antennas may be made using leaky coaxial cable designed to radiate at the angle of the Doppler null.

Figure 2:
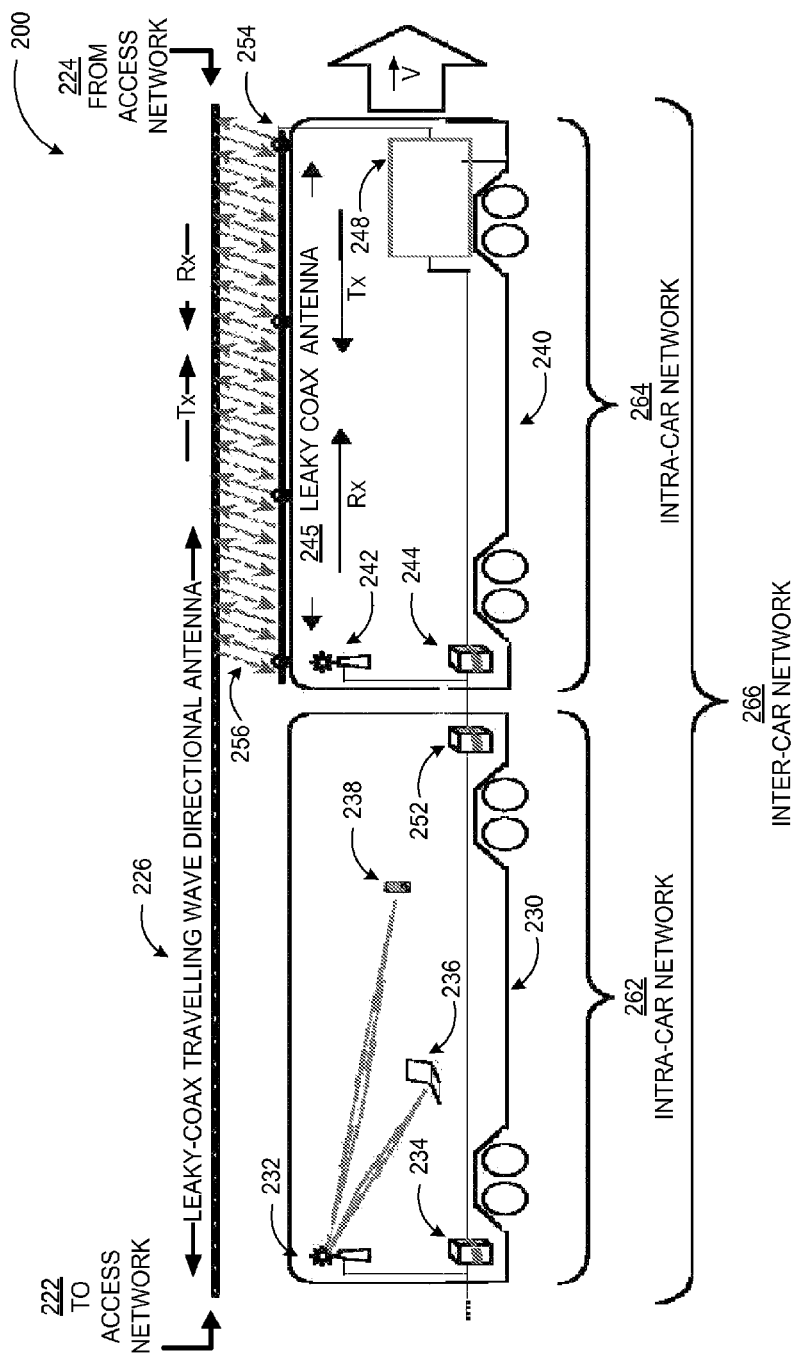
FIG. 2 illustrates Doppler-nulling travelling-wave antenna relays in high-speed rail wireless communications.

FIG. 2 illustrates Doppler-nulling travelling-wave antenna relays in high-speed rail wireless communications in accordance with at least some embodiments described herein.

Embodiments enable wireless communication between mobile terminals on high-speed vehicles (particularly high-speed rail) and stationary base stations without suffering Doppler shifting of the signal frequency due to the vehicle's motion. This capability is possible because the Doppler shift in radio transmissions from a moving transmitter depends upon the angle of the signal path relative to the direction of motion of the transmitter. By pairing a traveling-wave directional antenna on the HSR with a matched traveling-wave directional antenna positioned alongside the railway, a communication channel may be established at a continuous Doppler null—the geometric configuration in which the Doppler effect introduces zero frequency shift on radio signals between a moving transmitter and a stationary receiver (and vice-versa).

Traveling-wave antennas use a traveling wave on a guiding structure as the main radiating mechanism, and when suitably designed they are able to radiate continuously along their length in highly directional beams. Diagram 200 depicts an implementation of a Doppler-nulling antenna relay system for mobile wireless communication in high-speed rail, using an aerial configuration. Each train car 230, 240 may include an intra-car network 262, 264 comprising wireless nodes 232, 242 (e.g., routers) and gateways 234, 244 (e.g., cellular repeaters or wireless bridges) for facilitating communication between on-board wireless devices (e.g., laptop 236 and cellular phone 238) and an access network. Gateway 252 in train car 230 may be coupled to gateway 244 in train car 240 as part of the inter-car network 266, or the gateways may be configured to operate as independent sub-networks.

The wireless traffic may be aggregated at a main access terminal 248 on the train and transmitted to the terrestrial access network using paired traveling-wave directional antennas 245 and 226 (leaky coaxial cables) mounted to the roof of the rail car and positioned along the railway, respectively; this step does not entail reprocessing of the wireless transmissions Both traveling-wave antennas may continually transmit and receive (256) at a fixed angle (254) relative to the motion of the train. The signal transmitted or received by the stationary antenna may be conducted by the leaky coax positioned along the railway 226 to a nearest node for communication with the access network. Because of the directional nature of the antenna coupling, signals received from the moving vehicle may be conducted to the node behind the vehicle (222), while signals transmitted to the moving vehicle may be conducted from the node in front of the vehicle (224).

Figure 3:
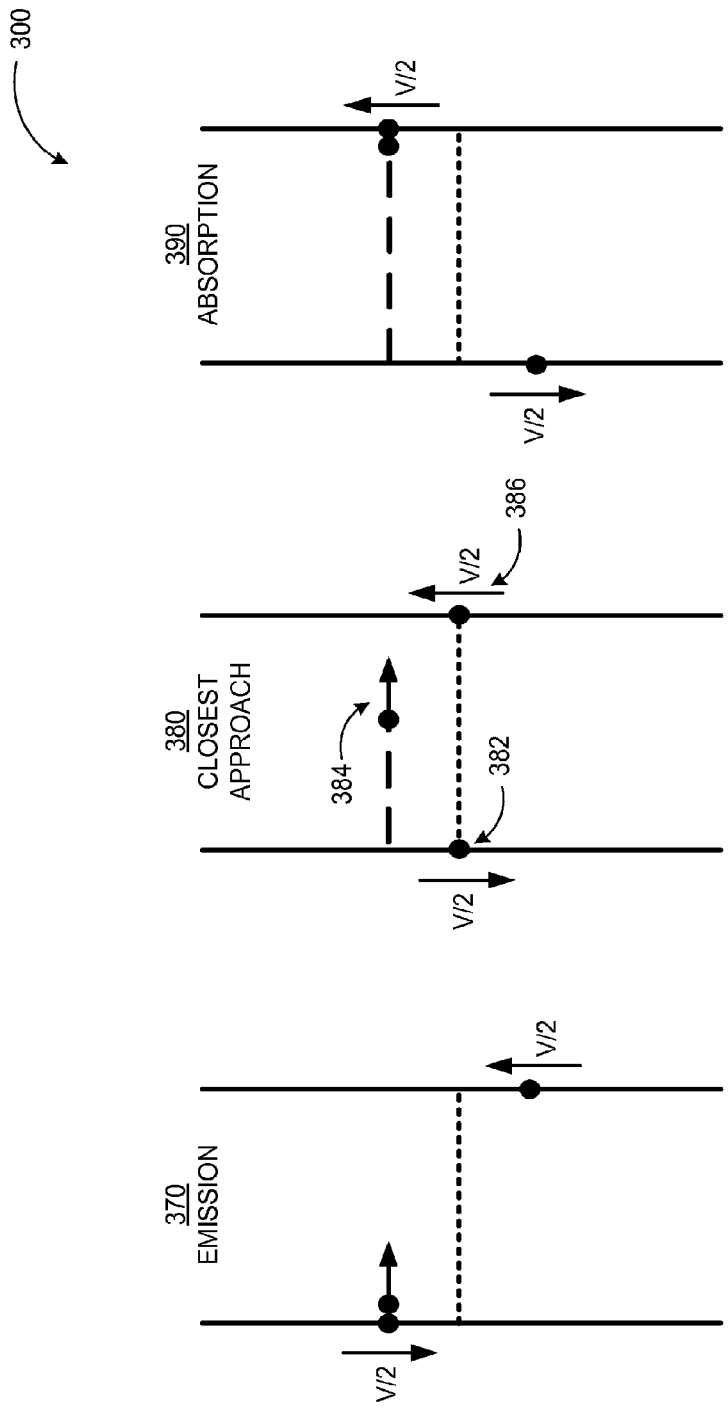
FIG. 3 illustrates an example configuration of the Doppler null for a point transmitter and receiver.

FIG. 3 illustrates an example configuration of the Doppler null for a point transmitter and receiver in accordance with at least some embodiments described herein.

When a mobile terminal moves toward a receiver the frequency of the received radio signal is increased (370), and when it moves away the frequency is decreased (390)—known as Doppler shift. As the terminal passes by the receiver, the frequency shift changes from positive to negative, and at one point the signal is momentarily unshifted. This point is known as the Doppler null.

For point transmitters and receivers, the Doppler null occurs for transmitted signals that pass through the midpoint between transmitter and receiver at the point of closest approach 380. The transmission originates before the point of closest approach, the reception occurs after the point of closest approach, and the angle of transmission 384 is perpendicular to the paths of the transmitter 382 and receiver 386 in a frame in which the midpoint is stationary. This configuration is portrayed in diagram 300.

The angle of signal launch and signal reception may be obtained by transforming to a frame where the transmitter or receiver is stationary. In the (stationary) frame of the emitter, this results when the angle θ is given by:

$$\theta = \cos^{-1}\left(\frac{1-\sqrt{1-v^2/c^2}}{\left|\frac{v}{c}\right|}\right) \approx \cos^{-1}\left(\frac{v}{2c}\right) \quad [1]$$

where θ is the transmission angle relative to the direction of motion of the emitter, v is the speed of the emitter, and c is the speed of light. For speeds characteristic of a terrestrial vehicle (≤400 km/h), θ deviates from 90° (broadside transmission) by no more than ~$10^{-5}$ degrees.

Figure 4:
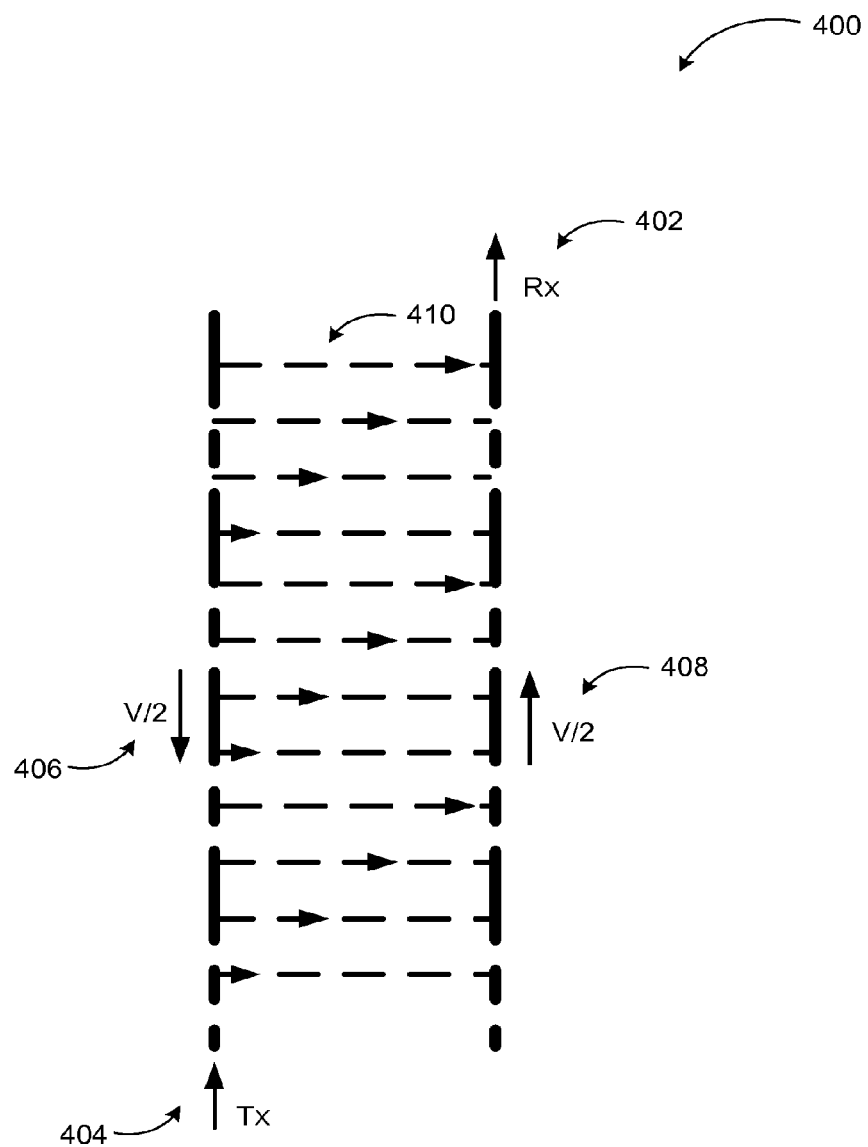
FIG. 4 illustrates an example configuration of a distributed Doppler null for a travelling-wave transmitter and receiver.

FIG. 4 illustrates an example configuration of a distributed Doppler null for a travelling-wave transmitter and receiver in accordance with at least some embodiments described herein.

The instantaneous geometry of FIG. 3 may be replaced by a continuous geometry when a travelling wave emitter 406 and receiver 408 are used. As shown in diagram 400, the transmitted signal 404 is continually radiated and subsequently received (402) by the traveling-wave receiver 408 as the transmitted signal 404 propagates up the travelling wave emitter 406. The path for the entire wave front 410 conforms to the configuration of a Doppler null.

Leaky coaxial cable can function as a directional traveling-wave antenna if the (periodic) spacing of the slots in the outer conductor sheath couples the guided wave mode into a single radiation mode. The wavenumber vector in these structures is complex as a result of radiation loss, and the phase velocity typically exceeds the speed of light. The lowest radiation mode that couples to a guided-wave mode is the negative fundamental, −1 mode, for which the radiated wave front is angled backward relative to the direction of propagation of the guided-wave. The radiation angle of this −1 mode may be given by:

$$\theta_{-1} = \sin^{-1}(\sqrt{\in} - \lambda/P) \quad [2]$$

where ∈ is the dielectric constant of the coaxial spacer material, λ is the free space wavelength of the radiated wave, and P is the period of the spacing between the slots in the coaxial cable.

One characteristic of such periodic structures is the occurrence of a stop band in the guided-wave mode at wavelengths that couple into the broadside radiation mode (θ≈90°). These are wavelengths for which equation [2] satisfies equation [1] for a moving antenna on HSR.

Figure 5:
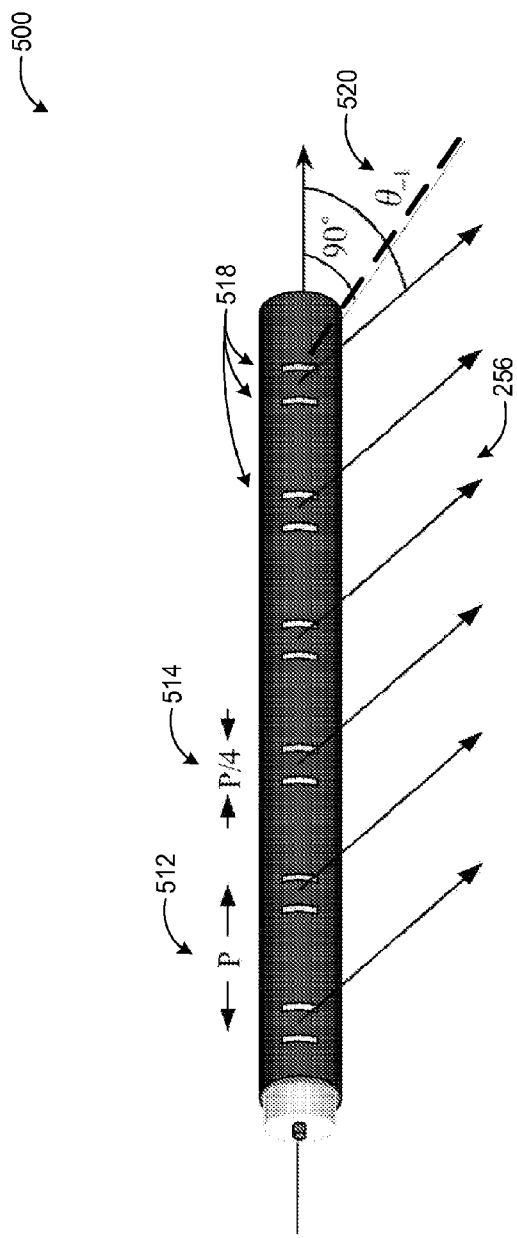
FIG. 5 illustrates leaky coaxial cable suitable for use as a travelling-wave directional antenna in high-speed rail wireless communications.

FIG. 5 illustrates leaky coaxial cable 500 suitable for use as a travelling-wave directional antenna in high-speed rail wireless communications in accordance with at least some embodiments described herein.

In a practical leaky coaxial-cable design for use as a travelling-wave directional antenna such as leaky coaxial cable 500, the slot geometry (518) provides highly directional coupling between collinear antenna pairs for the design frequencies at angles 520 close to 90°, as required for Doppler nulling. Interleaving a second array of slots offset by P/4 (514) from the first set separated by P (512) eliminates the stop band, permitting the use of leaky coaxial cables as traveling-wave directional antennas suitable for Doppler nulling relay systems.

Because signals received at 90° couple equally into forward and backward propagating modes, it is further advantageous to design the directional antennas to transmit and receive at a small angular offset from 90° so as to separate the direction of conduction of the transmitted and received signals in the traveling wave antennas. The resulting frequency shift in the communicating signal can be kept small enough to not introduce intercarrier interference. The Doppler shift resulting from directional antennas transmitting at an angle that deviates from 90° by an amount φ is given by:

$$\Delta v = v \frac{v}{c} \sin\phi \quad [3]$$

For example, the Doppler shift accruing to a 2.4 GHz signal relayed to/from a train traveling at 350 km/hr using directional antennas that transmit at angles from 5° to 10° lies in the range of 25 Hz to 135 Hz, respectively.

While embodiments have been discussed above using specific examples, components, scenarios, and configurations in FIG. 2 through FIG. 5, they are intended to provide a Doppler-nulling traveling-wave antenna relay for high-speed vehicular communications. These examples do not constitute a limitation on the embodiments, which may be implemented using other components, frame selection schemes, and configurations using the principles described herein.

Figure 6:
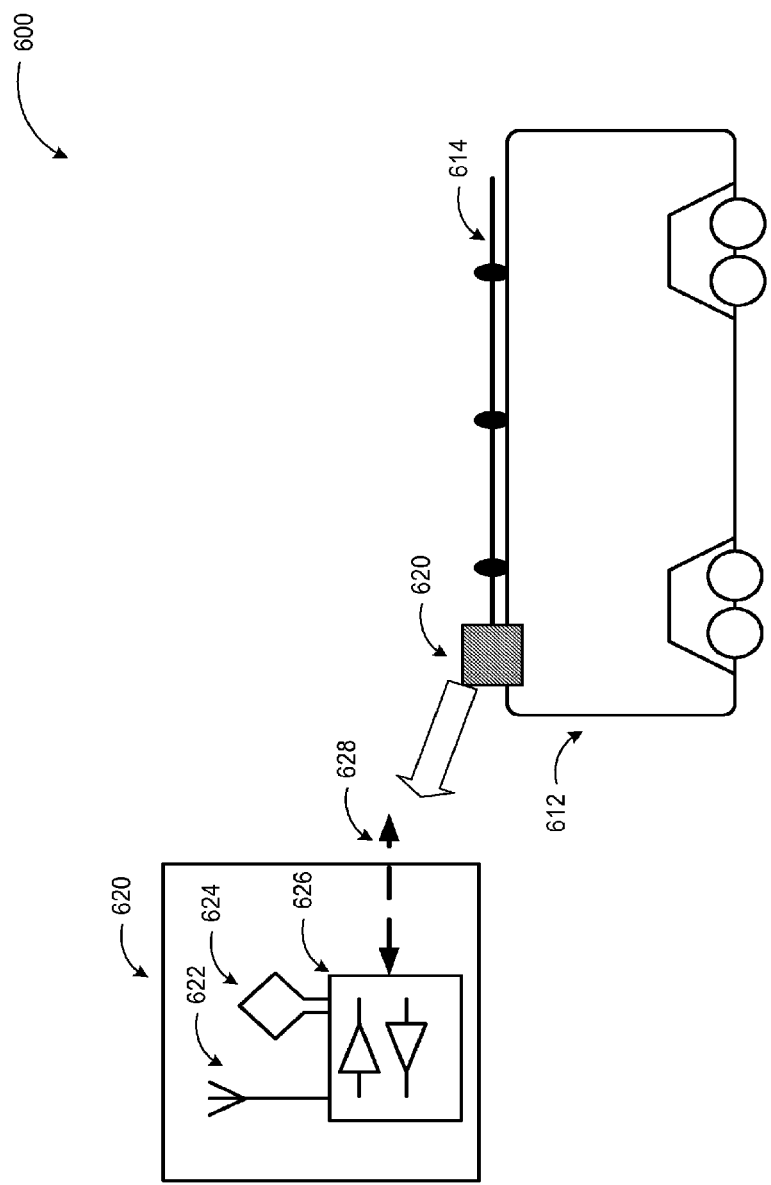
FIG. 6 illustrates an example cellular-repeater configuration, which may be used to control cellular telephone communications through a traveling-wave directional antenna.

FIG. 6 illustrates an example cellular-repeater configuration in diagram 600, which may be used to mediate cell phone communications through a traveling-wave directional antenna 614 in accordance with at least some embodiments described herein. In a basic configuration, a cellular repeater 620 includes an internal reception antenna 622, an internal broadcast antenna 624, and a bidirectional signal amplifier 626 that is connected (628) to the traveling wave directional antenna 614 mounted to the rail car 612. While antennas 622 and 624 are illustrated as two different types of antennas, they may be any type of suitable antenna of the same type or of different types.

Figure 7A:
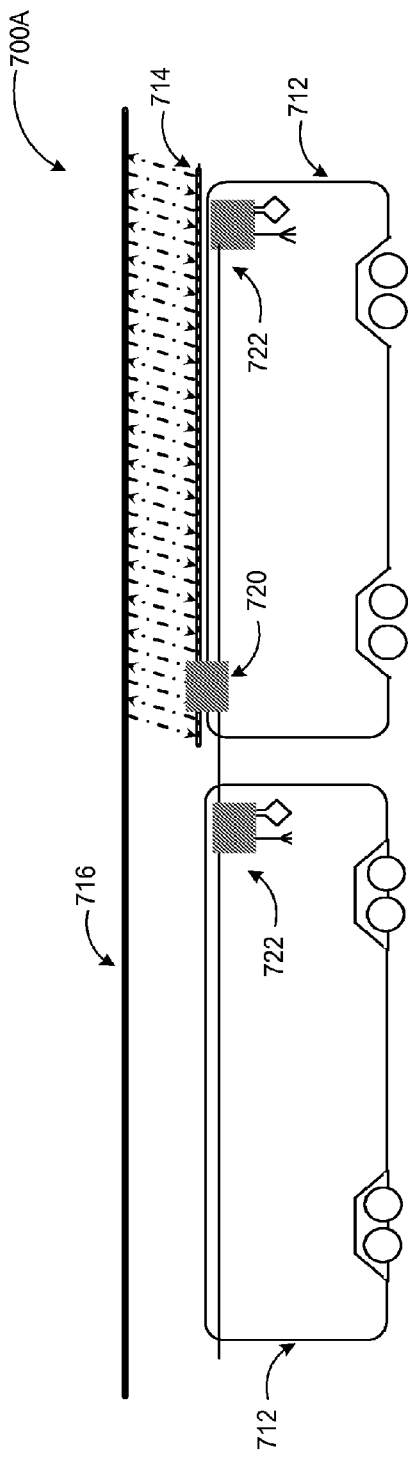
FIGS. 7A and 7B illustrate example point-to-point and point-to-multipoint client-bridge configurations, which may be used to control packetized data communications through a traveling-wave directional antenna.
Figure 7B:
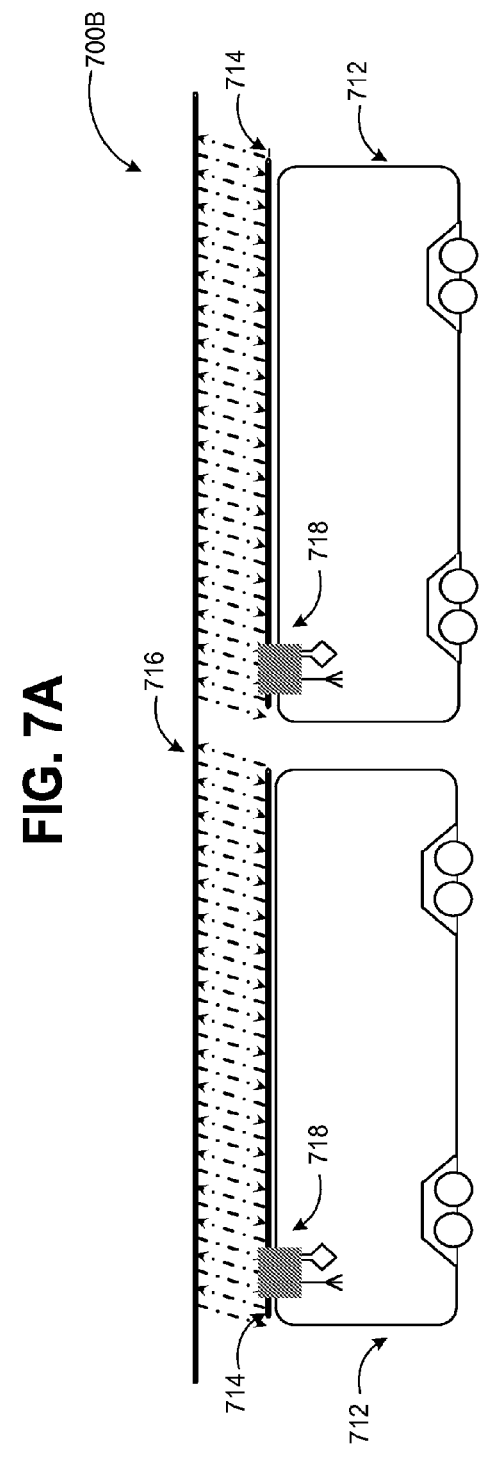

FIGS. 7A and 7B illustrate example point-to-point and point-to-multipoint client-bridge configurations, which may be used to control packetized data communications through a traveling-wave directional antenna in accordance with at least some embodiments described herein. In a basic configuration, a wireless bridge (point-to-multipoint router 718 or combination of point-to-point bridge 720 and access router 722) functions as a simple repeater in the same manner as a cellular repeater. In some embodiments as shown in diagram 700A, the wireless bridge may be configured in a point-to-point configuration with a combination of one point-to-point bridge 720 per train and at least one access router 722 per railcar 712. Data packets may be exchanged between a stationary wireless access point and the point-to-point bridge 720 on the train through stationary traveling-wave antenna 716 and onboard traveling-wave antenna 714 enabling wireless terminals on the train to communicate with stationary wireless networks.

Diagram 700B illustrates a point-to-multipoint configuration, which permits each rail car to support a separate sub-network while communicating with the same terrestrial access point via the Doppler-nulling antenna relays. In this configuration, a wireless client bridge may comprise a plurality of point-to-multipoint routers 718 (e.g., one per railcar 712) that may be set to the same service set identifier. The routers are each connected to a traveling-wave directional antenna 714 on the railcar 712 serviced by the router.

Figure 8:
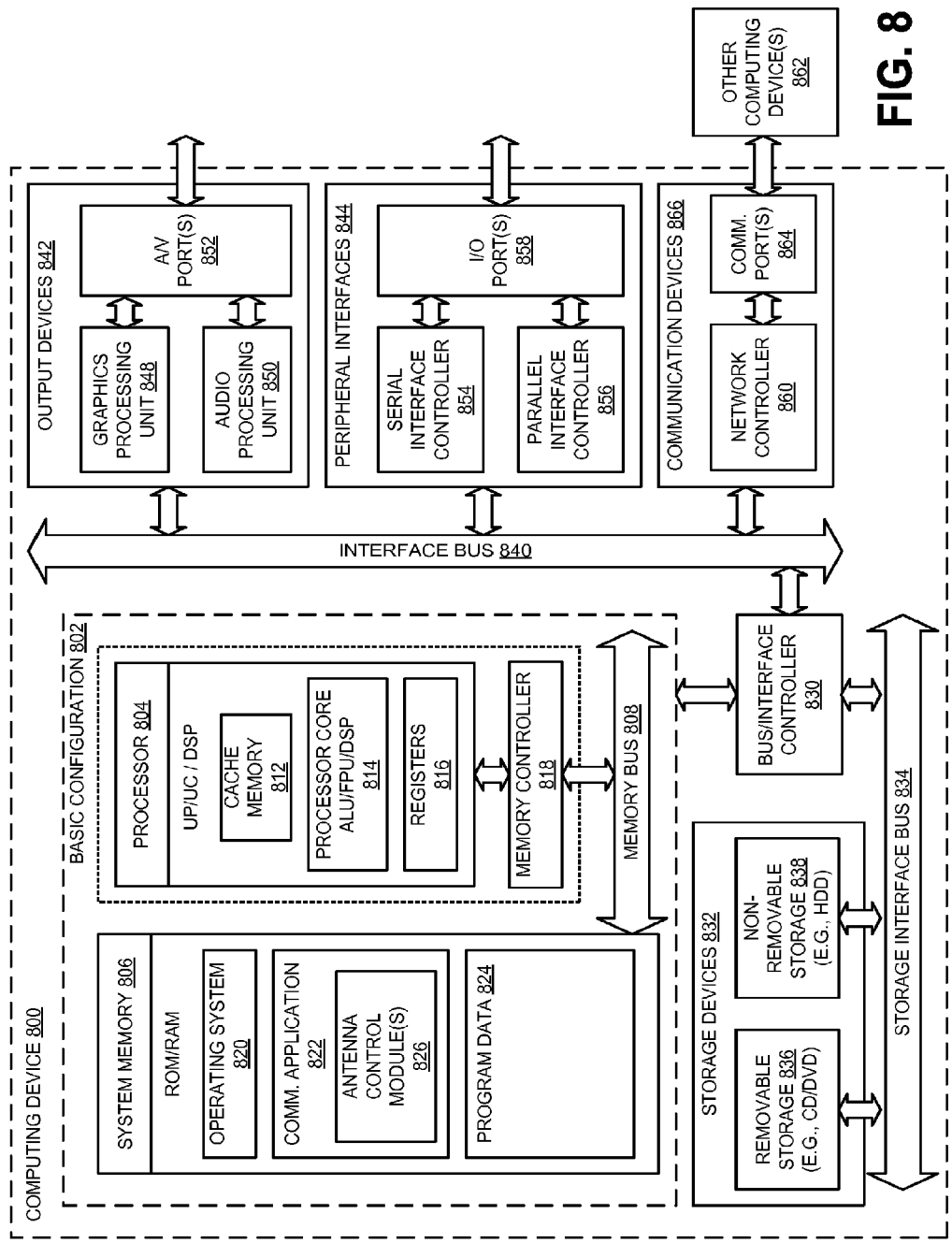
FIG. 8 illustrates a general purpose computing device, which may be used for software control of wireless communications through a travelling-wave directional antenna in lieu of a the hardware implementations of FIGS. 6 and 7.

FIG. 8 illustrates a general purpose computing device, which may be used for software control of wireless communications through a travelling-wave directional antenna in lieu of a the hardware implementations of FIGS. 6 and 7 in accordance with at least some embodiments described herein. In a very basic configuration 802, computing device 800 typically includes one or more processors 804 and a system memory 806. A memory bus 808 may be used for communicating between processor 804 and system memory 806.

Depending on the desired configuration, processor 804 may be of any type including but not limited to a microprocessor (µP), a microcontroller (µC), a digital signal processor (DSP), or any combination thereof. Processor 804 may include one more levels of caching, such as a level cache memory 812, a processor core 814, and registers 816. Example processor core 814 may include an arithmetic logic unit (ALU), a floating point unit (FPU), a digital signal processing core (DSP Core), or any combination thereof. An example memory controller 818 may also be used with processor 804, or in some implementations memory controller 815 may be an internal part of processor 804.

Depending on the desired configuration, system memory 806 may be of any type including but not limited to volatile memory (such as RAM), non-volatile memory (such as ROM, flash memory, etc.) or any combination thereof. System memory 806 may include an operating system 820, a communication application 822, and antenna control module 826. System memory 806 may further include program data 824. Communication application 822 may facilitate wireless communication through an access network. Antenna control module 826 may control matched traveling wave directional antennas mounted to a high-speed rail vehicle and positioned collinearly alongside the railway such that the antennas continually transmit and receive at a fixed angle relative to the motion of the train so as to compensate for Doppler shift. The signal transmitted or received by the stationary antenna may be conducted to a nearest node for communication with an access network. This described basic configuration 802 is illustrated in FIG. 8 by those components within the inner dashed line.

Computing device 800 may have additional features or functionality, and additional interfaces to facilitate communications between basic configuration 802 and any required devices and interfaces. For example, a bus/interface controller 830 may be used to facilitate communications between basic configuration 802 and one or more data storage devices 832 via a storage interface bus 834. Data storage devices 832 may be removable storage devices 834, non-removable storage devices 838, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 806, removable storage devices 836 and non-removable storage devices 838 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of computing device 800.

Computing device 800 may also include an interface bus 840 for facilitating communication from various interface devices (e.g., output devices 842, peripheral interfaces 844, and communication devices 866 to basic configuration 802 via bus/interface controller 830. Example output devices 842 include a graphics processing unit 848 and an audio processing unit 850, which may be configured to communicate to various external devices such as a display or speakers via one or more A/V ports 852. Example peripheral interfaces 844 include a serial interface controller 854 or a parallel interface controller 856, which may be configured to communicate with external devices such as input devices (e.g., keyboard, mouse, pen, voice input device, touch input device, etc.) or other peripheral devices (e.g., printer, scanner, etc.) via one or more I/O ports 858. An example communication device 866 includes a network controller 860, which may be arranged to facilitate communications with one or more other computing devices 862 over a network communication link via one or more communication ports 864.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a physical server, virtual server, a computing cloud, or a hybrid device that include any of the above functions. Computing device 800 may also be implemented as a personal computer including both laptop computer and non-laptop computer configurations. Moreover computing device 800 may be implemented as a networked system or as part of a general purpose or specialized server.

Networks for a networked system including computing device 800 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 9:
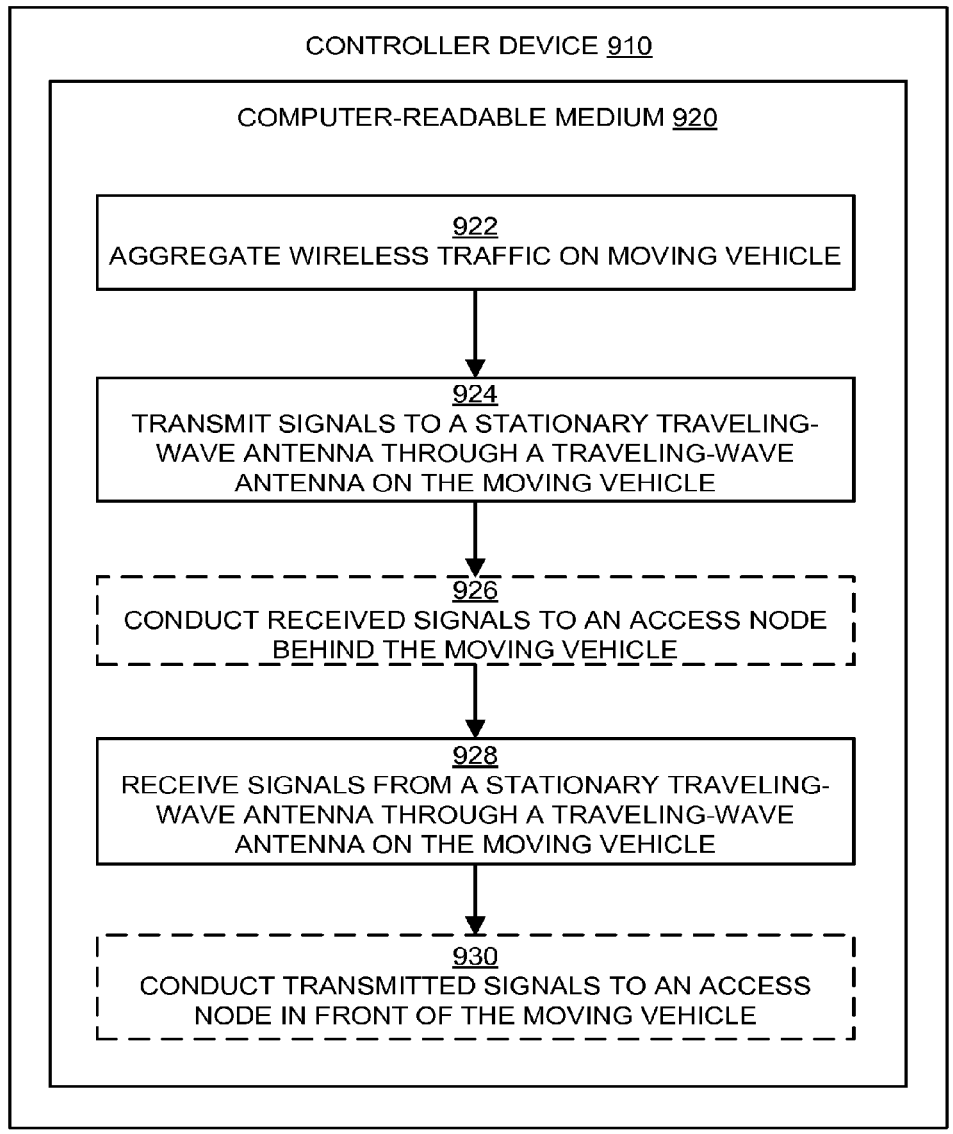
FIG. 9 is a flow diagram illustrating an example method for use of travelling-wave directional antenna in high-speed vehicle wireless communications that may be performed in a computing device such as device 800 in FIG. 8.

FIG. 9 is a flow diagram illustrating an example method for use of travelling-wave directional antenna in high-speed vehicle wireless communications that may be performed in a computing device such as device 800 in FIG. 8 in accordance with at least some embodiments described herein. The operations described in FIG. 9 may be performed as a result of execution of instructions stored in a computer-readable medium 920 by controller device 910. Controller device 910 may be a special purpose control device or a general purpose computer such as computing device 800 of FIG. 8.

An example process according to embodiments may begin with operation 922, "AGGREGATE WIRELESS TRAFFIC ON MOVING VEHICLE", where wireless communications to and from mobile devices on a moving vehicle (e.g., a high-speed train car) may be aggregated at a wireless node (e.g., a router) 232 or a train access terminal 248. Operation 922 may be followed by operation 924, "TRANSMIT SIGNALS TO A STATIONARY TRAVELING-WAVE ANTENNA THROUGH A TRAVELING-WAVE ANTENNA ON THE MOVING VEHICLE", where the train access terminal 248 may cause the aggregated traffic to be facilitated through continual transmission by the leaky coax antenna 245 to a stationary leaky coax traveling-wave antenna 226 along the railway at a fixed angle relative to the motion of the train so as to compensate for Doppler shift.

Operation 924 may be followed by optional operation 926, "CONDUCT RECEIVED SIGNALS TO AN ACCESS NODE BEHIND THE MOVING VEHICLE", where signals may be forwarded from the stationary leaky coax traveling-wave antenna 226 along the railway to the access network (222) through one of a plurality of access nodes. Optional operation 926 may be followed by operation 928, "RECEIVE SIGNALS FROM A STATIONARY TRAVELING-WAVE ANTENNA THROUGH A TRAVELING-WAVE ANTENNA ON THE MOVING VEHICLE", where the train access terminal 248 may receive signals from the access network (224) through the leaky coax antenna 245 through transmission at a fixed angle relative to the motion of the train. Operation 928 may be followed by optional operation 930, "CONDUCT TRANSMITTED SIGNALS TO AN ACCESS NODE IN FRONT OF THE MOVING VEHICLE", where signals may be forwarded from the stationary leaky coax traveling-wave antenna 226 along the railway to the access network (222) through one of a plurality of access nodes.

Figure 10:
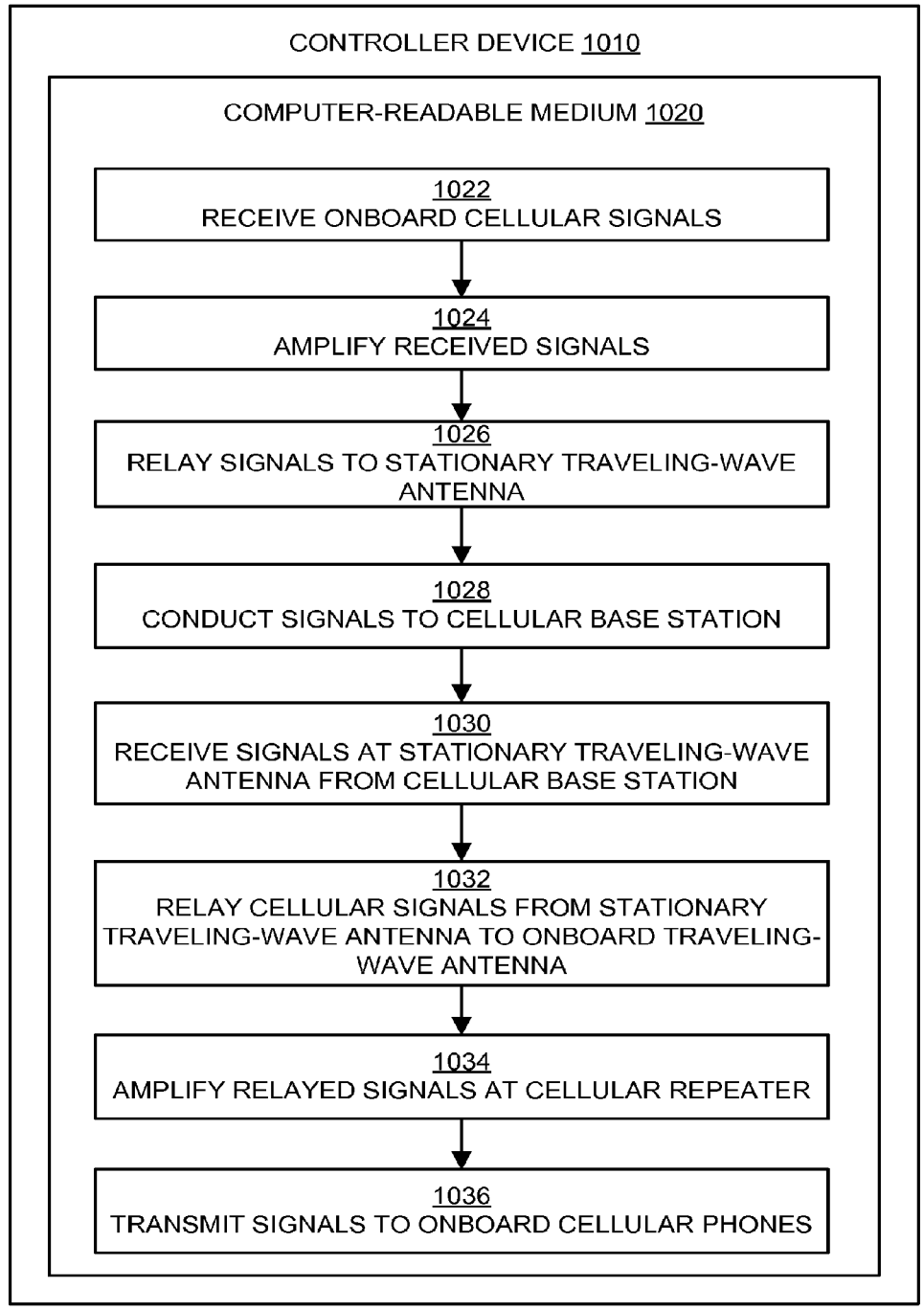
FIG. 10 is a flow diagram illustrating an example method for use of traveling-wave directional antenna in high-speed vehicle communications that may be performed in a cellular repeating device such as 620 in FIG. 6.

FIG. 10 is a flow diagram illustrating an example method for use of traveling-wave directional antenna in high-speed vehicle communications that may be performed in a cellular repeating device such as 620 in FIG. 6 in accordance with at least some embodiments described herein. The operations described in FIG. 10 may be performed as a result of execution of instructions stored in a computer-readable medium 1020 by controller device 1010.

An example process according to embodiments may begin with operation 1022, "RECEIVE ONBOARD CELLULAR SIGNALS", where cellular signals from cellular phones on moving vehicle 612 may be received using and onboard receive (non-directional) antenna 624. Operation 1022 may be followed by operation 1024, "AMPLIFY RECEIVED SIGNALS", where the received signals may be amplified at the onboard cellular repeater 620 for transmission between relay antennas.

Operation 1024 may be followed by operation 1026, "RELAY SIGNALS TO STATIONARY TRAVELING-WAVE ANTENNA", where the amplified cellular signals may be relayed from traveling-wave antenna on the moving vehicle 612 to stationary traveling-wave antenna 226. The signals may be launched from the back/front of the vehicle toward the front/back of the vehicle, respectively.

Operation 1026 may be followed by operation 1028, "CONDUCT SIGNALS TO CELLULAR BASE STATION", where the relayed signals may be received on the stationary traveling-wave antenna and conducted to a cellular base station in-front-of/behind the vehicle. The received signals may be conducted in a direction toward/opposite the direction of motion of the vehicle, respectively.

Operation 1028 may be followed by operation 1030, "RECEIVE SIGNALS AT STATIONARY TRAVELING-WAVE ANTENNA FROM CELLULAR BASE STATION", where return signals from the cellular base station located behind/in-front of the vehicle may be relayed along the stationary traveling-wave antenna in the direction toward/opposite the motion of the vehicle, respectively.

Operation 1030 may be followed by operation 1032, "RELAY CELLULAR SIGNALS FROM STATIONARY TRAVELING-WAVE ANTENNA TO ONBOARD TRAVELING-WAVE ANTENNA", where the cellular signals may be relayed from the stationary traveling-wave antenna to the traveling-wave antenna on the moving vehicle. The signals launched from the base station behind/in-front-of the vehicle may be received at the front/back of the vehicle, respectively.

Operation 1032 may be followed by operation 1034, "AMPLIFY RELAYED SIGNALS AT CELLULAR REPEATER", where the signals may be relayed from relay antennas to the non-directional antenna(s) at the cellular repeater 620.

Operation 1034 may be followed by operation 1036, "TRANSMIT SIGNALS TO ONBOARD CELLULAR PHONES", where the cellular signals received from the base station are transmitted from the onboard transmit antenna to cellular phones in the moving vehicle.

Figure 11:
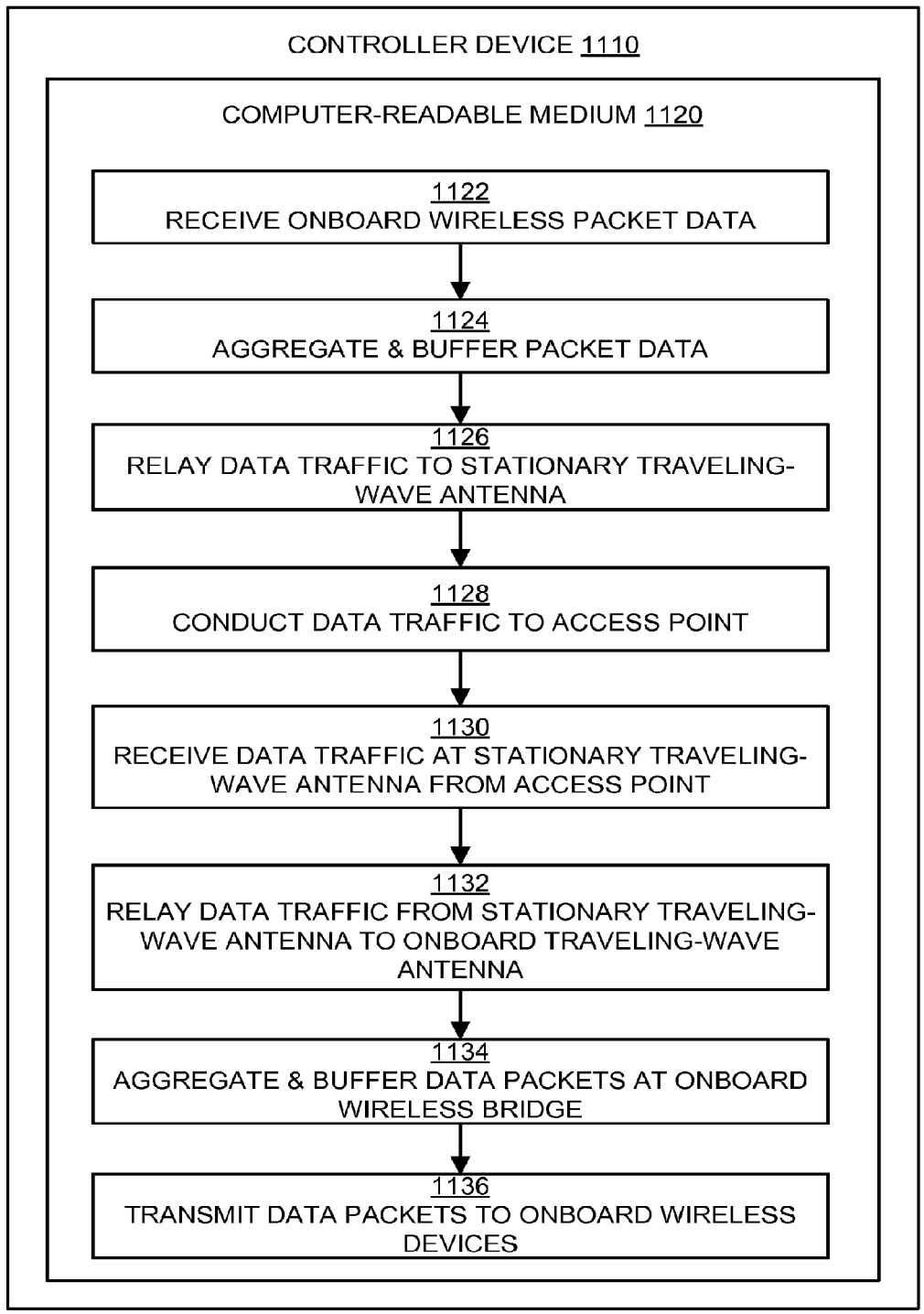
FIG. 11 is a flow diagram illustrating an example method for use of traveling-wave directional antenna in high-speed vehicle communications that may be performed in a client bridge device such as 718 in FIG. 7.

FIG. 11 is a flow diagram illustrating an example method for use of traveling-wave directional antenna in high-speed vehicle communications that may be performed in a client bridge device such as 718 in FIG. 7 in accordance with at least some embodiments described herein. The operations described in FIG. 11 may be performed as a result of execution of instructions stored in a computer-readable medium 1120 by controller device 1110.

An example process according to embodiments may begin with operation 1122, "RECEIVE ONBOARD WIRELESS PACKET DATA", where packet data traffic from wireless data terminals on moving vehicle 712 may be received using onboard point-to-multipoint router 718 or access router 722. Operation 1122 may be followed by operation 1124, "AGGREGATE & BUFFER PACKET DATA", where the data packets received from terminals at the data-link layer may be aggregated and buffered using point-to-multipoint router 718 according to a point-to-multipoint protocol (e.g., Wireless Distribution System or access point-client configuration) or point-to-point bridge 720.

Operation 1124 may be followed by operation 1126, "RELAY DATA TRAFFIC TO STATIONARY TRAVELING-WAVE ANTENNA", where the data traffic from the traveling-wave antenna 714 on moving vehicle 712 may be relayed to the stationary traveling-wave antenna 716. The signals may be launched from the back/front of the vehicle toward the front/back of the vehicle, respectively.

Operation 1126 may be followed by operation 1128, "CONDUCT DATA TRAFFIC TO ACCESS POINT", where the relayed data traffic may be received on the stationary traveling-wave antenna 716 and conducted to a wireless access point in-front-of/behind the vehicle. The received traffic may be conducted in a direction toward/opposite the direction of motion of the vehicle, respectively.

Operation 1128 may be followed by operation 1130, "RECEIVE DATA TRAFFIC AT STATIONARY TRAVELING-WAVE ANTENNA FROM ACCESS POINT", where return packet data traffic may be conducted from the wireless access point located behind/in-front of the vehicle along stationary traveling-wave antenna 716 in the direction toward/opposite the motion of the vehicle, respectively.

Operation 1130 may be followed by operation 1132, "RELAY DATA TRAFFIC FROM STATIONARY TRAVELING-WAVE ANTENNA TO ONBOARD TRAVELING-WAVE ANTENNA", where the data traffic from the stationary traveling-wave antenna 716 may be relayed to the traveling-wave antenna 714 on the moving vehicle 712. The signals launched from the base station behind/in-front-of the vehicle may be received at the front/back of the vehicle, respectively.

Operation 1132 may be followed by operation 1134, "AGGREGATE & BUFFER DATA PACKETS AT ONBOARD WIRELESS BRIDGE", where the data packets received from the wireless access point at the data-link layer may be aggregated and buffered using point-to-multipoint router 718 according to a point-to-multipoint protocol (e.g., Wireless Distribution System or access point-client configuration) or point-to-point bridge 720.

Operation 1134 may be followed by operation 1136, "TRANSMIT DATA PACKETS TO ONBOARD WIRELESS DEVICES", where the packet data traffic received from wireless access point is transmitted to wireless devices in the moving vehicle 712 using the onboard transmit antenna system.

The operations included in the processes of FIGS. 9, 10, and 11 described above are for illustration purposes. Using a travelling-wave directional antenna in high-speed vehicle wireless communications may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 12:
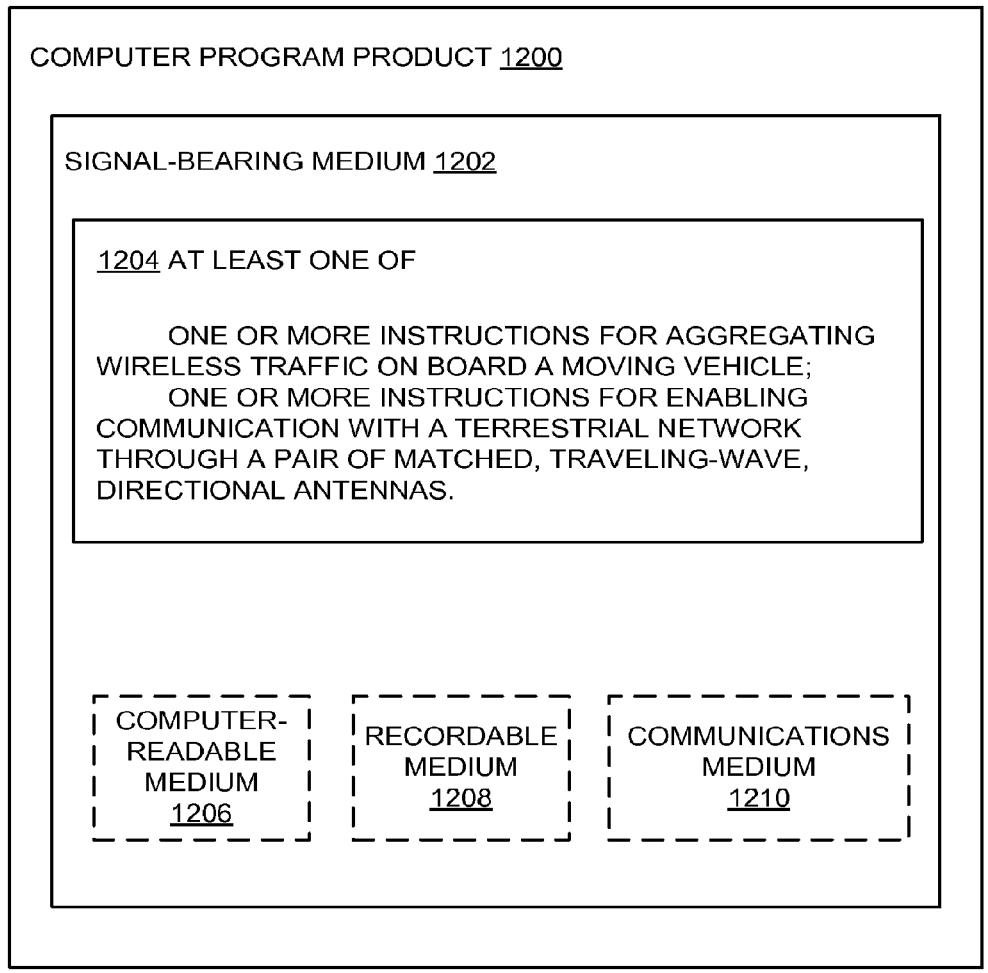
FIG. 12 illustrates a block diagram of an example computer program product, all arranged in accordance with at least some embodiments described herein.

FIG. 12 illustrates a block diagram of an example computer program product, arranged in accordance with at least some embodiments described herein.

In some examples, as shown in FIG. 12, computer program product 1200 may include a signal bearing medium 1202 that may also include machine readable instructions 1204 that, when executed by, for example, a processor, may provide the functionality described above with respect to FIG. 2 through FIG. 5. Thus, for example, referring to processor 804, one or more of the tasks shown in FIG. 12 may be undertaken in response to instructions 1204 conveyed to the processor 804 by medium 1202 to perform actions associated with eliminating Doppler shift in high-speed wireless communications as described herein. Some of those instructions may include aggregating wireless traffic on board a moving vehicle and enabling communication with a terrestrial network through a matched pair of traveling-wave directional antennas.

In some implementations, signal bearing medium 1202 depicted in FIG. 12 may encompass a computer-readable medium 1206, such as, but not limited to, a hard disk drive, a Compact Disc (CD), a Digital Versatile Disk (DVD), a digital tape, memory, etc. In some implementations, signal bearing medium 1202 may encompass a recordable medium 1208, such as, but not limited to, memory, read/write (R/W) CDs, R/W DVDs, etc. In some implementations, signal bearing medium 1202 may encompass a communications medium 1210, such as, but not limited to, a digital and/or an analog communication medium (e.g., a fiber optic cable, a waveguide, a wired communications link, a wireless communication link, etc.). Thus, for example, computer program product 1200 may be conveyed to the processor 1204 by an RF signal bearing medium 1202, where the signal bearing medium 1202 is conveyed by a wireless communications medium 1210 (e.g., a wireless communications medium conforming with the IEEE 802.11 standard).

According to some examples, a method for enhancing wireless communications in high-speed vehicles through Doppler-nulling traveling-wave antenna relays may include aggregating wireless traffic from a plurality of wireless communication devices at an access terminal on a moving vehicle; and forwarding the wireless traffic to a wireless communication network through a pair of matched traveling-wave directional antennas. A first of the antennas may be positioned on the moving vehicle and a second of the antennas may be positioned along a path of the moving vehicle. The second antenna may be conductively coupled to one or more access nodes of the wireless communication network.

The first and second antennas may be suitably designed to radiate continuously along their length in highly directional beams and arranged to transmit and receive at a predefined angle relative to a motion of the moving vehicle. The predefined angle may deviate from 90 degrees between about 5 degrees and about 10 degrees. In some examples, the predefined angle may be selected to correspond to a Doppler null.

The method may also include conducting signals received at the second antenna to a nearest access node of the wireless communication network, conducting signals received from the moving vehicle to an access node behind the moving vehicle, and/or conducting signals transmitted to the moving vehicle to an access node in front of the moving vehicle. The moving vehicle may be a high-speed train with the first antenna affixed to a train car and the second antenna positioned along a railroad.

The first and/or the second antenna may be a leaky coaxial cable antenna, a slot array antenna, a directional dipole array antenna, and/or a patch array antenna. The method may further include positioning a first array of radiating elements of the first and second antennas at a periodic predefined distance such that a guided wave mode of the antennas couples into a single radiation mode. A second array of radiating elements may be interleaved along each antenna offset by about a quarter of the periodic predefined distance from the first array of radiating elements such that a stop band in the guided wave mode at wavelengths that couple into a broadside radiation mode is eliminated.

According to other examples, a wireless communication system enabling communication between high-speed vehicles and a terrestrial network through Doppler-nulling traveling-wave antenna relays may include an access terminal adapted to aggregate wireless traffic from a plurality of wireless communication devices on a moving vehicle and forward the aggregated wireless traffic to the terrestrial network through a pair of matched traveling-wave directional antennas, a first traveling-wave directional antenna affixed to the moving vehicle, and a second traveling-wave directional antenna positioned along a path of the moving vehicle. The second antenna may be conductively coupled to one or more access nodes of the wireless communication network.

The first and second antennas may be suitably designed to radiate continuously along their length in highly directional beams and arranged to transmit and receive at a predefined angle relative to a motion of the moving vehicle. The predefined angle may deviate from 90 degrees between about 5 degrees and about 10 degrees. In some examples, the predefined angle may be selected to correspond to a Doppler null.

Signals received at the second antenna may be conducted to a nearest access node of the terrestrial network. Signals received from the moving vehicle may be conducted to an access node behind the moving vehicle. Signals transmitted to the moving vehicle may be conducted to an access node in front of the moving vehicle. Furthermore, the moving vehicle may be a high-speed train, the first antenna affixed to a train car, and the second antenna positioned along a railroad.

The first and/or the second antenna may be a leaky coaxial cable antenna, a slot array antenna, a directional dipole array antenna, and/or a patch array antenna. A first array of radiating elements of the first and second antennas may be positioned at a periodic predefined distance such that a guided wave mode of the antennas couples into a single radiation mode. A second array of radiating elements may be interleaved along each antenna offset by about a quarter of the periodic predefined distance from the first array of radiating elements such that a stop band in the guided wave mode at wavelengths that couple into a broadside radiation mode is eliminated.

According to further examples, a traveling-wave, directional antenna system for enabling wireless communication between high-speed vehicles and a terrestrial network may include a first traveling-wave directional antenna affixed to a moving vehicle adapted to receive aggregated wireless traffic from a plurality of wireless communication devices on the moving vehicle and forward the wireless traffic to the terrestrial network through a matching second traveling-wave antenna and the second traveling-wave directional antenna positioned along a path of the moving vehicle and conductively coupled to one or more access nodes of the wireless communication network.

The first and second antennas may be suitably designed to radiate continuously along their length in highly directional beams and arranged to transmit and receive at a predefined angle relative to a motion of the moving vehicle. The predefined angle may deviate from 90 degrees between about 5 degrees and about 10 degrees. In some examples, the predefined angle may be selected to correspond to a Doppler null.

The second antenna may be adapted to conduct signals received from the first antenna to a nearest access node of the terrestrial network. The second antenna may further be adapted to conduct signals received from the moving vehicle to an access node behind the moving vehicle. The second antenna may also be adapted to conduct signals transmitted to the moving vehicle to an access node in front of the moving vehicle.

The moving vehicle may be a high-speed train with the first antenna affixed to a train car and the second antenna positioned along a railroad. The first and/or second antenna may be a leaky coaxial cable antenna, a slot array antenna, a directional dipole array antenna, and/or a patch array antenna. A first array of radiating elements of the first and second antennas may be positioned at a periodic predefined distance such that a guided wave mode of the antennas couples into a single radiation mode. A second array of radiating elements may be interleaved along each antenna offset by about a quarter of the periodic predefined distance from the first array of radiating elements such that a stop band in the guided wave mode at wavelengths that couple into a broadside radiation mode is eliminated.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

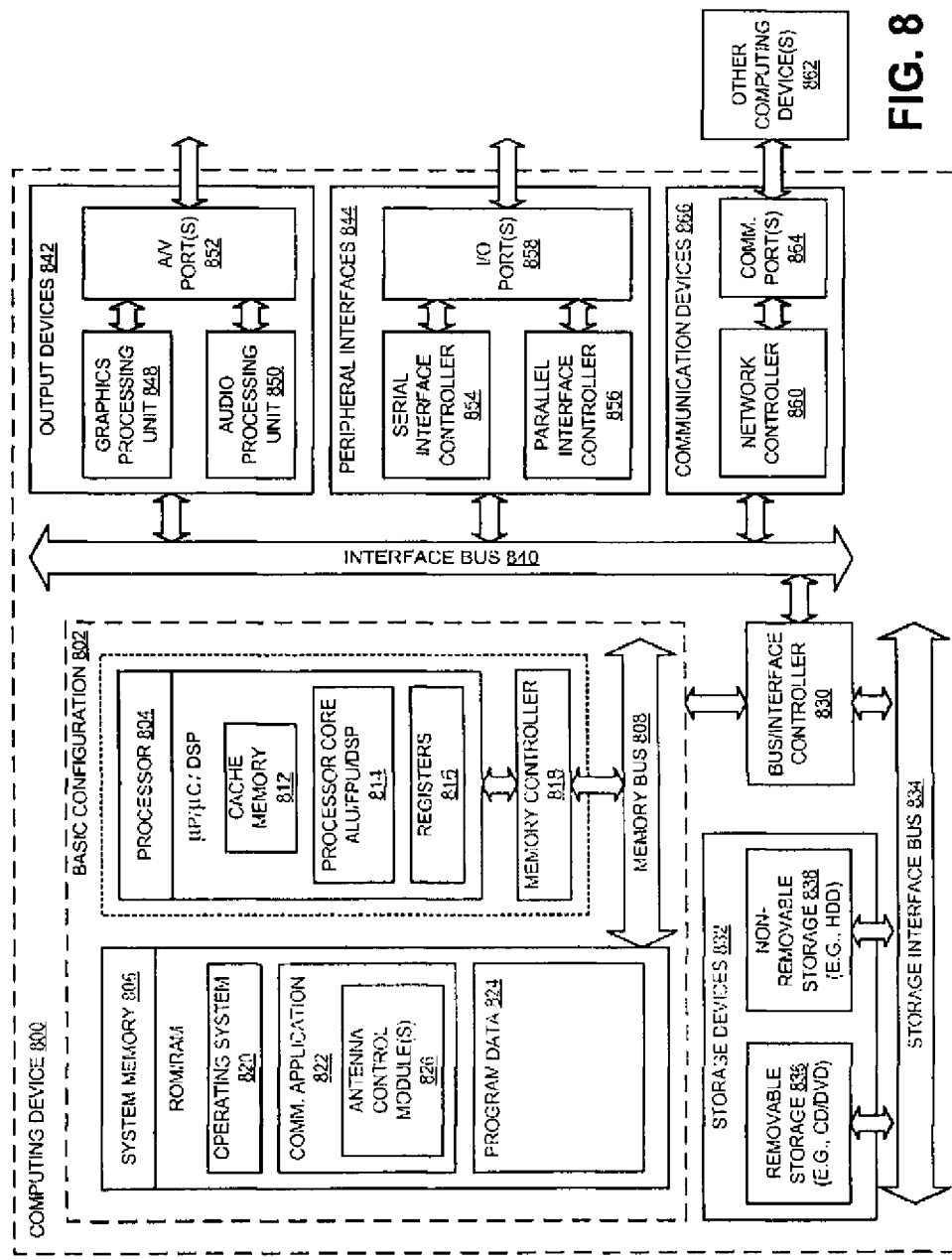

What is claimed is:

1. A method to enhance wireless communications in high-speed vehicles through Doppler-nulling traveling-wave antenna relays, the method comprising:
   aggregating wireless traffic from a plurality of wireless communication devices at an access terminal on a moving vehicle; and
   forwarding the wireless traffic to a wireless communication network through a pair of matched traveling-wave directional antennas arranged to transmit and receive signals at a predefined angle such that a Doppler effect on the transmitted and received signals resulting from a motion of a first of the antennas positioned on the moving vehicle relative to a second of the antennas positioned along a path of the moving vehicle introduces zero frequency shift on the signals between the matched traveling-wave directional antennas, wherein the second antenna is conductively coupled to one or more access nodes of the wireless communication network.

2. The method according to claim 1, wherein the first and second antennas are suitably designed to radiate continuously along their length in highly directional beams.

3. The method according to claim 2, wherein the first and second antennas are further arranged to transmit and receive at the predefined angle relative to a motion of the moving vehicle.

4. The method according to claim 3, wherein the predefined angle deviates from 90 degrees between about 5 degrees and about 10 degrees.

5. The method according to claim 1, further comprising conducting signals received at the second antenna to a nearest access node of the wireless communication network.

6. The method according to claim 5, further comprising conducting signals received from the moving vehicle to an access node behind the moving vehicle.

7. The method according to claim 5, further comprising conducting signals transmitted to the moving vehicle to an access node in front of the moving vehicle.

8. The method according to claim 1, wherein the moving vehicle is a high-speed train, the first antenna is affixed to a train car, and the second antenna is positioned along a railroad.

9. The method according to claim 1, wherein at least one of the first and second antennas is one of: a leaky coaxial cable antenna, a slot array antenna, a directional dipole array antenna, and/or a patch array antenna.

10. The method according to claim 9, further comprising positioning a first array of radiating elements of the first and second antennas at a periodic predefined distance such that a guided wave mode of the antennas couples into a single radiation mode.

11. The method according to claim 10, further comprising interleaving a second array of radiating elements along each antenna offset by about a quarter of the periodic predefined distance from the first array of radiating elements such that a stop band in the guided wave mode at wavelengths that couple into a broadside radiation mode is eliminated.

12. A wireless communication system to enable communication between high-speed vehicles and a terrestrial network through Doppler-nulling traveling-wave antenna relays, the system comprising:
   an access terminal adapted to aggregate wireless traffic from a plurality of wireless communication devices on a moving vehicle and forward the aggregated wireless traffic to the terrestrial network through a pair of matched traveling-wave directional antennas, the matched traveling-wave directional antennas arranged to transmit and receive signals at a predefined angle such that a Doppler effect on the transmitted and received signals resulting from a motion of a first traveling-wave directional antenna relative to a second traveling-wave directional antenna introduces zero frequency shift on the signals between the matched traveling-wave directional antennas;
   the first traveling-wave directional antenna affixed to the moving vehicle; and
   the second traveling-wave directional antenna positioned along a path of the moving vehicle, wherein the second antenna is conductively coupled to one or more access nodes of the wireless communication network.

13. The system according to claim 12, wherein the first and second antennas are suitably designed to radiate continuously along their length in highly directional beams.

14. The system according to claim 12, wherein the first and second antennas are further arranged to transmit and receive at the predefined angle relative to a motion of the moving vehicle.

15. The system according to claim 14, wherein the predefined angle deviates from 90 degrees between about 5 degrees and about 10 degrees.

16. The system according to claim 12, wherein signals received at the second antenna are conducted to a nearest access node of the terrestrial network.

17. The system according to claim 16, wherein signals received from the moving vehicle are conducted to an access node behind the moving vehicle.

18. The system according to claim 16, wherein signals transmitted to the moving vehicle are conducted to an access node in front of the moving vehicle.

19. The system according to claim 12, wherein the moving vehicle is a high-speed train, the first antenna is affixed to a train car, and the second antenna is positioned along a railroad.

20. The system according to claim 12, wherein at least one of the first and second antennas is one of: a leaky coaxial cable antenna, a slot array antenna, a directional dipole array antenna, and/or a patch array antenna.

21. The system according to claim 20, wherein a first array of radiating elements of the first and second antennas are positioned at a periodic predefined distance such that a guided wave mode of the antennas couples into a single radiation mode.

22. The system according to claim 21, wherein a second array of radiating elements are interleaved along each antenna offset by about a quarter of the periodic predefined distance from the first array of radiating elements such that a stop band in the guided wave mode at wavelengths that couple into a broadside radiation mode is eliminated.

23. A traveling-wave, directional antenna system to enable wireless communication between high-speed vehicles and a terrestrial network, the system comprising:
 a first traveling-wave directional antenna affixed to a moving vehicle adapted to receive aggregated wireless traffic from a plurality of wireless communication devices on the moving vehicle and forward the wireless traffic to the terrestrial network through a matching second traveling-wave antenna, wherein the matched first and second traveling-wave directional antennas are arranged to transmit and receive signals at a predefined angle such that a Doppler effect on the transmitted and received signals resulting from a motion of the first traveling-wave directional antenna relative to the second traveling-wave directional antenna introduces zero frequency shift on the signals between the matched first and second traveling-wave directional antennas; and
 the second traveling-wave directional antenna positioned along a path of the moving vehicle and conductively coupled to one or more access nodes of the wireless communication network.

24. The antenna system according to claim 23, wherein the first and second antennas are suitably designed to radiate continuously along their length in highly directional beams.

25. The antenna system according to claim 23, wherein the first and second antennas are further arranged to transmit and receive at the predefined angle relative to a motion of the moving vehicle.

26. The antenna system according to claim 25, wherein the predefined angle deviates from 90 degrees between about 5 degrees and about 10 degrees.

27. The antenna system according to claim 23, wherein the second antenna is adapted to conduct signals received from the first antenna to a nearest access node of the terrestrial network.

28. The antenna system according to claim 27, wherein the second antenna is adapted to conduct signals received from the moving vehicle to an access node behind the moving vehicle.

29. The antenna system according to claim 27, wherein the second antenna is adapted to conduct signals transmitted to the moving vehicle to an access node in front of the moving vehicle.

30. The antenna system according to claim 23, wherein the moving vehicle is a high-speed train, the first antenna is affixed to a train car, and the second antenna is positioned along a railroad.

31. The antenna system according to claim 23, wherein at least one of the first and second antennas is one of: a leaky coaxial cable antenna, a slot array antenna, a directional dipole array antenna, and/or a patch array antenna.

32. The antenna system according to claim 31, wherein a first array of radiating elements of the first and second antennas are positioned at a periodic predefined distance such that a guided wave mode of the antennas couples into a single radiation mode.

33. The antenna system according to claim 32, wherein a second array of radiating elements are interleaved along each antenna offset by about a quarter of the periodic predefined distance from the first array of radiating elements such that a stop band in the guided wave mode at wavelengths that couple into a broadside radiation mode is eliminated.

* * * * *

UNITED STATES PATENT AND TRADEMARK OFFICE
CERTIFICATE OF CORRECTION

PATENT NO. : 8,948,690 B2
APPLICATION NO. : 13/395880
DATED : February 3, 2015
INVENTOR(S) : Duerksen It is certified that error appears in the above-identified patent and that said Letters Patent is hereby corrected as shown below:

On the title page item (86), under "PCT No.", in Column 1, Line 1, delete "PCT/US2011/005275" and insert -- PCT/US2011/052575 --, therefor.

On the title page item (56), under "OTHER PUBLICATIONS", in Column 2, Line 2, delete "www.wi-planet." and insert -- www.wi-fiplanet. --, therefor.

In the Drawings

In the drawing sheet, consisting of Fig. 8, should be deleted to be replaced with the drawing sheet, consisting of Fig. 8, as shown on the attached page.

In the Specification

In Column 1, below Title, Line 4, insert -- CROSS REFERENCE TO RELATED APPLICATIONS
The present application is a U.S. national stage application filing under 35 U.S.C. § 371 of International Application No. PCT/US2011/052575, filed on Sep. 21, 2011. --.

In Column 2, Line 46, delete "of a the" and insert -- of the --, therefor.

In Column 2, Line 50, delete "FIG. 8; and" and insert -- FIG. 8; --, therefor.

In Column 7, Line 27, delete "of a the" and insert -- of the --, therefor.

In Column 8, Line 4, delete "device 834," and insert -- device 836, --, therefor.

In Column 8, Line 30, delete "(e.g.," and insert -- e.g., --, therefor.

In Column 15, Line 11, delete "and or" and insert -- and/or --, therefor.

Signed and Sealed this
Thirtieth Day of June, 2015

Michelle K. Lee
*Director of the United States Patent and Trademark Office*